Aug. 20, 1957     L. O. SCHAFER     2,803,202
METHOD AND APPARATUS FOR FORMING ORNAMENTAL OBJECTS
Filed July 17, 1953     4 Sheets-Sheet 1
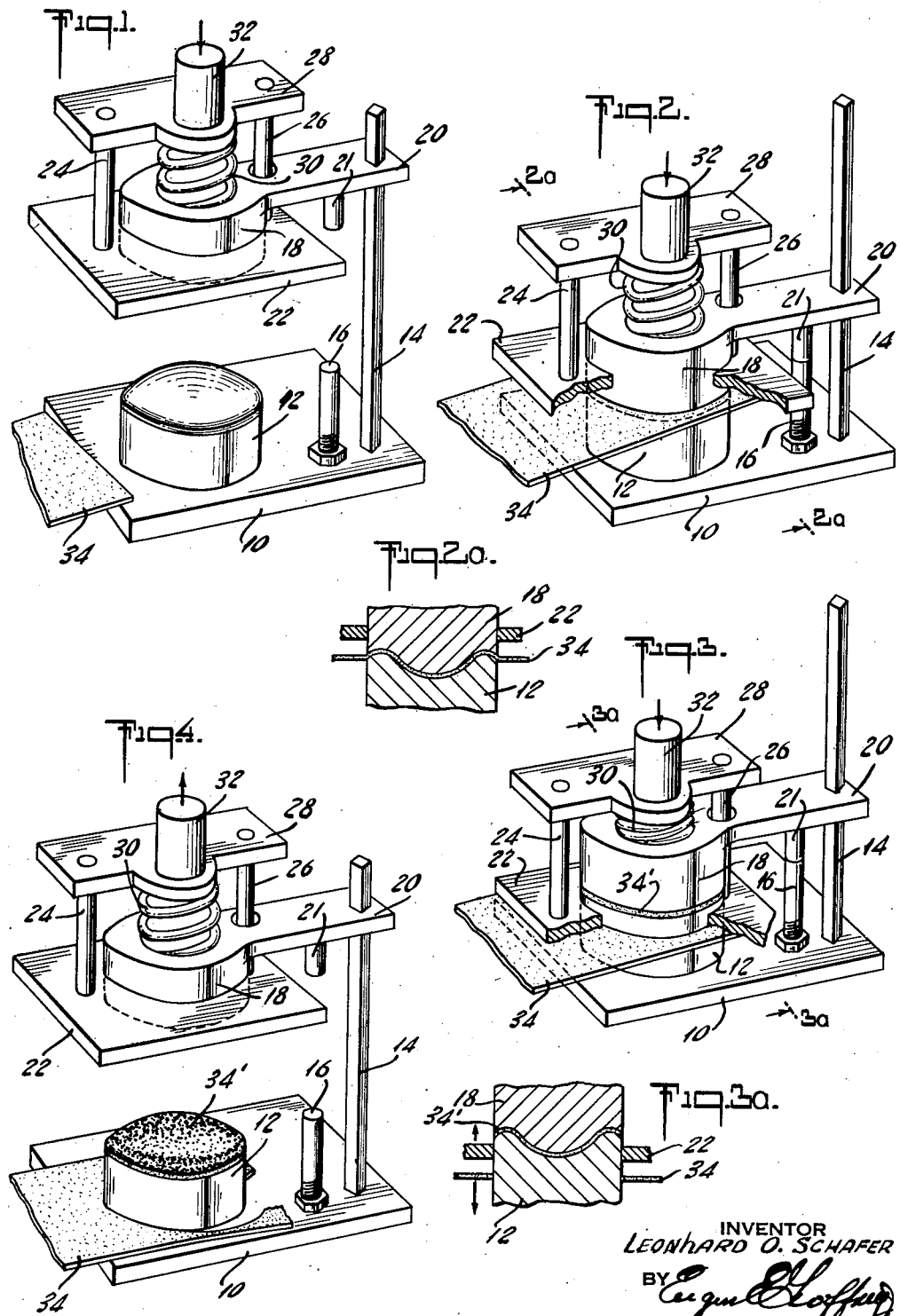
INVENTOR
LEONHARD O. SCHAFER
BY
ATTORNEY

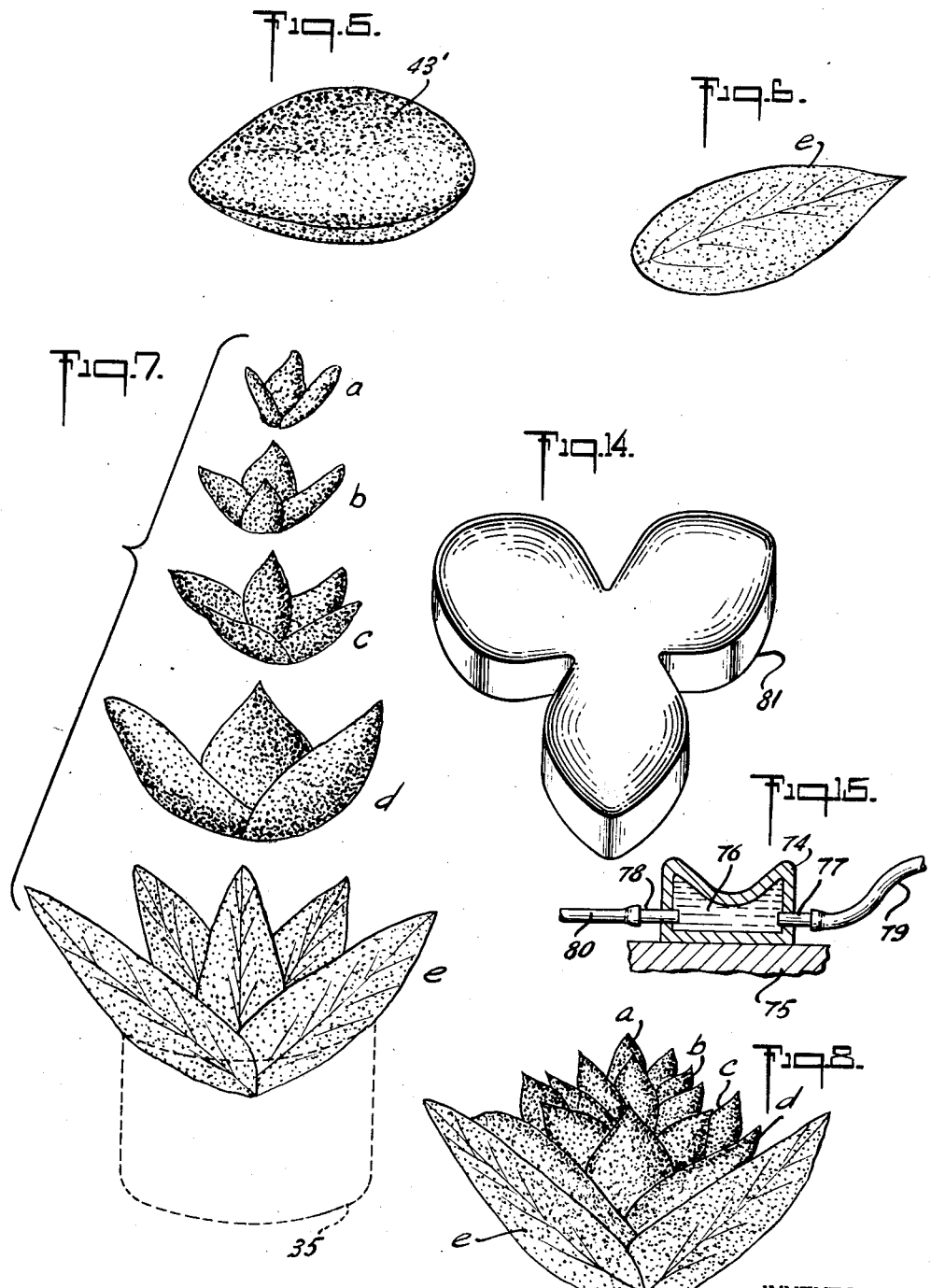

Aug. 20, 1957   L. O. SCHAFER   2,803,202
METHOD AND APPARATUS FOR FORMING ORNAMENTAL OBJECTS
Filed July 17, 1953   4 Sheets-Sheet 3

INVENTOR
LEONHARD O. SCHAFER
BY
ATTORNEY

Aug. 20, 1957 L. O. SCHAFER 2,803,202
METHOD AND APPARATUS FOR FORMING ORNAMENTAL OBJECTS
Filed July 17, 1953 4 Sheets-Sheet 4
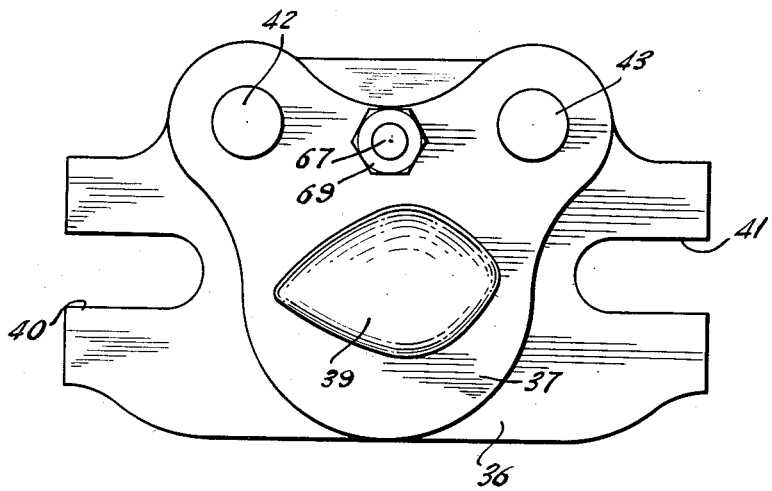
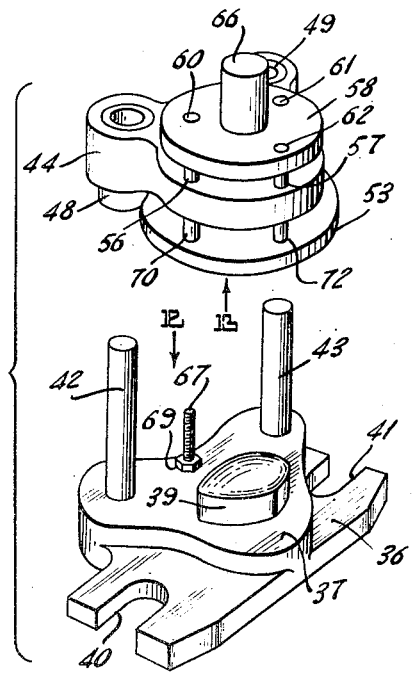
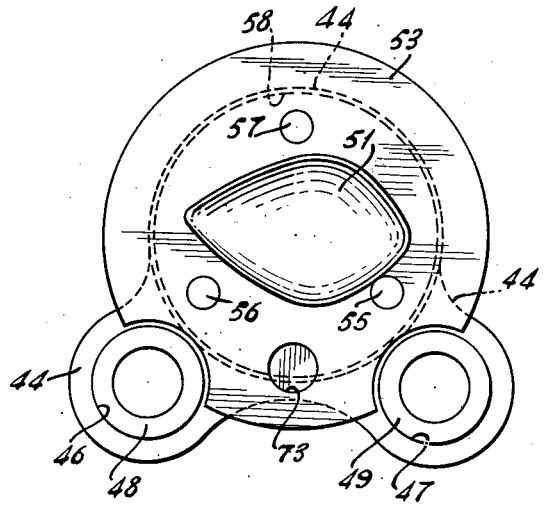
INVENTOR
LEONHARD O. SCHAFER
BY
ATTORNEY

United States Patent Office

2,803,202
Patented Aug. 20, 1957

2,803,202

METHOD AND APPARATUS FOR FORMING ORNAMENTAL OBJECTS

Leonhard Otto Schafer, Bronx, N. Y.

Application July 17, 1953, Serial No. 368,772

8 Claims. (Cl. 107—15)

This invention relates to a method and apparatus for forming ornamental objects and designs and more particularly concerns the fabrication of flowers and other shapes of edible materials such as a pulled sugar candy or the like for the decoration of cakes, cookies and other foods.

Heretofore, the manufacture or fabrication of ornamental objects such as flowers, leaves and other objects from a pulled sugar candy has been accomplished entirely by hand. While sugar candy absorbs moisture quite readily, the objects fabricated therefrom must be maintained in a dry atmosphere until actually served. Notwithstanding this shortcoming, its use has been continued because it affords an edible medium through which more realistic colors may be obtained. Experience has also taught that the high gloss which is most desirable in candy flowers for instance can only be effectively secured through formation of the individual components of the flowers and other objects by hand. This procedure is of course a costly one because of the tedious hand work involved and the fact that the candy must be worked quickly at sufficiently low temperatures to avoid burns and irritations of the skin and complete the fabrication before the sugar becomes too cold.

This invention completely overcomes the difficulties heretofore encountered in hand operations for forming sugar candy as set forth above and provides means whereby the components of the flowers or other ornaments may be fabricated by preformed dies and at higher working temperature. It has been found that flowers and the like fabricated in accordance with the invention not only have a gloss at least as fine as hand formed sugar but in addition have been found to withstand humidity and other adverse conditions for considerably longer periods of time.

With the elimination of hand operations through this invention, except possibly for the relatively simple procedure of assembly the component parts of an ornament, highly skilled labor is no longer necessary, fabrication time is materially reduced and more uniform and durable ornaments are produced. A still further object of the invention resides in the more effective utilization of the candy in that a materially larger number of ornaments can be fabricated of a given quantity of candy than was heretofore obtainable by hand methods.

A further object of the invention is the provision of apparatus for automatically forming components or groups of components simultaneously for the fabrication of ornaments that not only avoids the need for hand operations, drastically reduces the time required for formation of the product and produces a more uniform product but also provides ornaments wherein the candy is uniformly treated and at the same time provided with a finer surface substantially free from cracks and imperfections that contribute to the more rapid absorption of moisture and consequent melting of the candy.

Still another object of the invention resides in a method for automatically fabricating sugar candy into ornamental objects wherein the candy may be prepared and worked at relatively high temperatures which greatly accelerates the entire process and which provides the formed components ready for assembly at a temperature well within the range that permits hand assembly.

A further object of the invention is an improved apparatus and method for fabricating edible ornaments in varying colors of heated sugar candy.

The above and other objects and advantages of this invention will become more apparent from the following description and accompanying drawings forming part of this application.

In the drawings:

Fig. 1 is a perspective view of one embodiment of the invention in diagrammatic form illustrating the first step in the process of fabricating sugar candy ornaments;

Fig. 2 is similar to Fig. 1 and illustrates the second step in the process;

Fig. 2a is a cross sectional view of Fig. 2 along the line 2a—2a thereof;

Figs. 3 and 4 are similar to Figs. 1 and 2 and illustrate the next successive steps in the process in accordance with the invention;

Fig. 3a is a cross sectional view of Fig. 4 taken along the line 3a—3a thereof;

Figs. 5 and 6 are perspective views of two objects fabricated in accordance with the invention;

Fig. 7 is a perspective exploded view of the components of a flower formed in accordance with the invention;

Fig. 8 is a perspective view of the assembled flower shown in Fig. 7;

Fig. 11 is a partially exploded view of the embodiment of the invention shown in Fig. 9;

Figs. 12 and 13 are plan views of the cooperating die members of the embodiment of Fig. 9;

Fig. 14 is a perspective view of a modified die member in accordance with the invention; and Fig. 15 is a cross sectional view of still another modification of a die in accordance with the invention.

Figure 9:
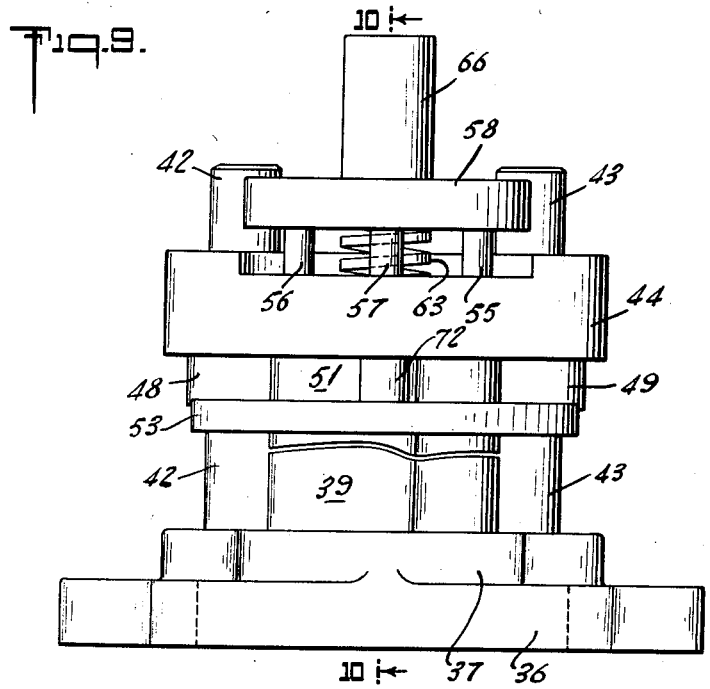
Fig. 9 is a front elevational view of one embodiment of apparatus in accordance with the invention.

Reference is made to Figs. 1 through 4a inclusive which illustrate diagrammatically the apparatus and steps in the process of fabricating an ornament of sugar candy. The simplified or diagrammatic version of the apparatus in these figures comprises a base 10 carrying a male die part 12, a vertical supporting rod 14 and an adjustable stop 16. The female die part 18, in this simplified structure, is carried by a carriage part 20 which extends laterally therefrom and engages the rectangular rod 14 carried by the base. This rod and carriage member maintain alignment of the die parts 12 and 18 which in addition to cooperating one with the other in the manner to be described have identical peripheral contours.

Surrounding the upper or movable die part 18 is a cutter plate 22 supported about midway of the die body by a pair of upwardly extending rods 24 and 26 secured at their upper ends to a transverse yoke member 28. This yoke is supported above the carriage 20 by a compression spring 30 interposed between the yoke and carriage and the entire unit is operated by the application of pressure to the shaft 32 secured to and extending upwardly from the yoke. The direction of the force applied to this shaft or stud 32 in each of the figures is indicated by an appropriate arrow extending therefrom.

Fig. 1 shows the apparatus in the open position preparatory to the receipt of a strip of candy 34 from which a leaf or petal is to be fabricated. The candy is positioned between the die parts 12 and 18 and pressure is applied to the shaft or coupler 32 to move the carriage 20 and die part 18 downwardly as shown in Fig. 2. The downward motion of the carriage is limited however by the stop 21 on the carriage 20 which cooperates with the adjustable stop 16 on the base 10. These stops 16 and 21 are adjusted so that the dies 12 and 18 will close to a point that will form the candy into the desired shape but that does not compress it or subject it to any pressure other than that required for shaping. Fig. 2a illustrates the shaping of the candy 34 without compression as it will be observed that the thickness of the shaped and unshaped portions of the candy strip 34 is substantially the same. The degree of shaping pressure however can be adjusted by means of the adjustable stop 16.

After the candy 34 is shaped by the dies 12 and 18, continued pressure on the shaft part 32 will cause the yoke 28 to compress the spring 30 as shown in Fig. 3 thus moving the cutting plate 22 downwardly. As the plate passes from a position surrounding the die part 18 to a position surrounding the die part 12, it severs the candy 34 to provide the desired contour for the finished piece. The dies 12 and 18 therefore must not only be shaped to form the candy but must also be arranged with the desired peripheral contour so that the formed candy will be shaped to resemble the petal or leaf being fabricated. The displacement of the cutting plate 22 to sever the candy is illustrated in Fig. 3a which shows the candy 34 as having been severed and the cutting plate 22 starting its return travel upwardly. This return travel of the plate 22 starts immediately upon the release of the downward pressure on the shaft 34 and as the shaft is pulled upwardly the plate returns to the position shown in Fig. 2 whereupon further upward movement of the shaft will carry the carriage 20 and die part 18 upwardly to the position shown in Fig. 1 preparatory to the formation of another leaf or petal. The formed petal 34' is now removable from the die part 12 and is ready to be joined with other petals or leaves to form the completed flower.

Exemplary of the ornamental forms that may be fabricated by this method is the finished single petal of Fig. 5 and the leaf of Fig. 6. It is apparent however that a wide variety of items may be made quickly and easily by this procedure, and the items thus formed are more durable and uniform than when fabricated by hand methods that have been heretofore accepted, to my knowledge, as the only satisfactory means for attaining high gloss realistic looking flowers and other similar ornaments.

Upon fabrication of the individual petals in accordance with the method and apparatus shown and described in connection with Figs. 1 to 4 inclusive, they are assembled in groups of three, four and five as shown in Fig. 7. For example, groups $a$ and $d$ may each have three petals joined at the center while group $b$ may have four petals and groups $c$ and $e$ five petals each. These groups may then be assembled by means of a cuplike member 35 in which group $e$ is first positioned. Then each of the succeeding groups $d$, $c$, $b$ and $a$ are placed in position and secured by exerting a small amount of pressure at the center to cause them to cohere one to the other. The completed flower is shown in Fig. 8 of the drawings.

Although any type of sugar candy may be used with this procedure, one type that has been found particularly desirable comprises a mixture of sugar, water and a fruit acid that is boiled at a temperature in the range of 250° F. to 300° F. The boiled candy is then placed on a slab and pulled by hand until it attains the desired consistency. After the candy has been pulled it is then passed between rolls to provide thin strips of the order of 1/16" to 1/8" in thickness.

An actual die for forming ornamental objects from pulled sugar candy is shown in Figs. 9 through 12 of the drawings. This die embodies the principles illustrated in Figs. 1 to 4 and is in a form for installation on a conventional hand or motor operated press of the type generally used for punching small metal parts. Inasmuch as presses of this character are well known in the art and constitute no part of this invention, drawings and description thereof have been omitted for simplicity.

This embodiment of the invention comprises a base part 36 having a raised central portion 37 formed integrally therewith and adapted to carry the lower die member 39. The base part 36 is also provided with a pair of inwardly extending slots 40 and 41 (Figs. 11 and 12) on either side thereof for securing the assembly to the bed of a suitable press as broadly discussed above. Extending upwardly from the base part 37, are a pair of rods or columns 42 and 43 for slidably supporting the upper carriage member 44. This carriage member is provided with a pair of openings 46 and 47 having bushings 48 and 49 tightly fitted therein which slidably cooperate with rods 42 and 43. These bushings preferably extend below the carriage 44 as shown in Fig. 11 in order to keep the carriage in accurate alignment with the base part 37 at all times.

The lower die 39 is secured to the base 37 by one or more screws 50 inserted through an opening in the base and threaded into a cooperating opening in the die. The upper die part 51 is similarly carried by the slidable carriage 44 and secured thereto by one or more screws 52 extending through the carriage and threaded into the die. These die parts are of course mounted in cooperating alignment as shown to effect the desired shaping of the candy. The upper carriage 44 in addition to carrying the die 51, also carries the cutter plate 53 having a central die 54 corresponding exactly to the peripheral contour of dies 39 and 51 and slidable thereover. This plate is held above the lower edge of the die part 54 by means of three studs or rods 55, 56 and 57 having threads on their lower ends for engagement with corresponding threaded openings in the plate 53. These rods extending upwardly through corresponding openings in the carriage 44 and are secured to an upper circular yoke 58. They may be secured to the yoke in any suitable manner as by the provision of openings 55', 57' and 58' extending part way through the yoke material and the insertion of screws 60, 61 and 62 through the yoke for threadable engagement with corresponding openings in the rods.

The yoke 58 is held in spaced relation to the upper surface of the carriage 44 by means of a spring 63 held in position by recesses 64 and 65 in the yoke and carriage respectively. The space between the yoke and carriage must of course be sufficient to permit the plate 53 to travel downwardly to a point where its lower surface extends below the lowest edge of the die part 39 in order to completely sever the candy.

Figure 10:
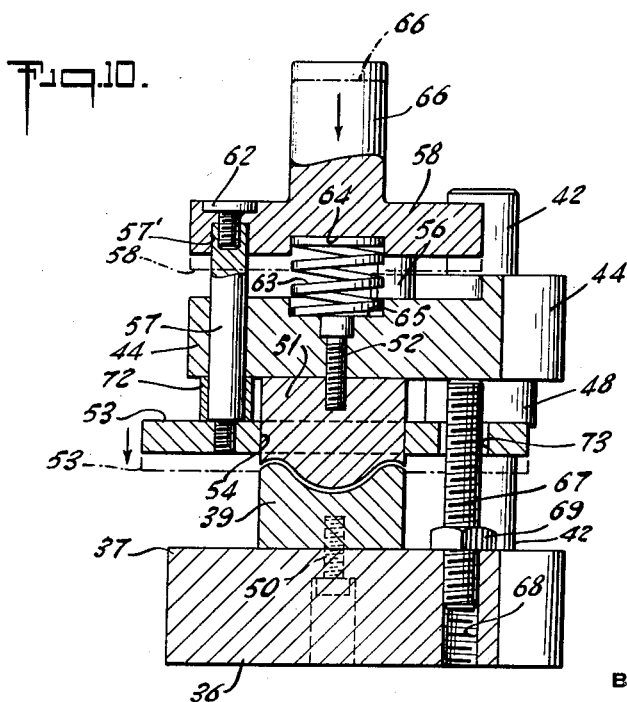
Fig. 10 is a cross sectional view of the embodiment shown in Fig. 9 taken along the line 10—10 thereof.

As in the case of the diagrammatic illustrations of Fig. 1 to 4, this embodiment of the invention also includes a stop screw 67 threadably mounted in a corresponding opening 68 in the base 37 and locked in position by a lock nut 69. When the carriage 44 is moved downwardly under the action of the press, the downward travel under the influence of spring 63 is limited by the stop 67 which extends through an opening 73 in plate 53 and contacts the underside of carriage 44 so that the dies 39 and 51 meet in a spaced relationship determined by the thickness of the candy strip 34 (Fig. 1) to be processed. Now, as in the case of the apparatus of Fig. 1 to 4, continued downward pressure on the stud 66 acts to compress the spring and permit the yoke 42 to move downward relative to the carriage 44. This moves the plate 53 downwardly past the opening between dies 39 and 51 to completely sever the candy to form the petal or leaf. The dotted line positions of the yoke 58 and plate 53 in the Fig. 10 show an intermediate downward position during the shearing action. In order to keep the spring 63 under slight compression and avoid undue play between the component parts, spacers 70, 71 and 72 may be placed about the rods 55, 56, 57 respectively at a point between the plate 53 and underside of the carriage 44.

With this improvised apparatus and method for shaping candy, a very high gloss can be secured that is equally as good if not superior to the gloss obtained with hand made flowers. Moreover, the surface of the candy formed in accordance with the invention has been found to withstand moisture and humidity very much longer and this is believed to result from the attainment of more uniform surface characteristics free from minute interstices and imperfections. It has also been found that this invention enables the candy to be worked at higher themperatures (of the order of 160° F. to 200° F.) than permissible with hand operations although it may be used at the lower temperatures as well. Excellent results are uniformly obtainable with this apparatus when the dies themselves are maintained at about room temperature and under certain circumstances it may therefore be desirable to provide temperature control means for maintaining the desired temperatures.

One method for controlling die temperatures is illustrated in Fig. 15 of the drawings. In this figure the die is denoted by the the numeral 74 and is mounted in any suitable manner to a base part 75. The die 74 has a chamber 76 within and includes a pair of conduits 77 and 78 communicating with the chamber. These conduits may be coupled with a suitable supply of liquid by means of hoses or other suitable coupling means 79 and 80. The liquid may be temperature controlled water or other suitable solution which if maintained through conventional means at about room temperature 60° F. to 90° F. or slightly below, will automatically maintain the proper die temperature. While this water cooling system is shown as being applied to only one die part, it is apparent that it could be applied equally well to both die parts.

If desired, the dies 39 and 51, instead of being arranged to form single petals or leaves as illustrated, they may be arranged to form petals in groups of three, four or five as may be desired. Fig. 14 shows a dies part 81 corresponding to the die part 39 of Fig. 10 except that it is arranged to fashion three petals at a time. Similar dies may of course be made to form any number of interconnected petals or leaves in a realistic fashion either in a plane as shown in Fig. 14 or resembling the configurations of Fig. 7. In each case, however, the pressure applied to the candy must be substantially limited only to the forming pressure for best results and high gloss.

While only certain embodiments of this invention have been shown and described it is apparent that other modifications, alterations and changes may be made without departing from the true scope and spirit thereof. For instance the relative movement of the cutter and dies may be changed to obtain the same end through substantially the same process, the mechanical structure carrying and operating the dies and cutter may be altered or the device may be arranged for hand operation intead of installation on a fixed press.

What is claimed is:

1. Apparatus for forming contoured objects from a relatively thin flat strip of pulled sugar candy to produce a high gloss surface free of imperfections comprising a pair of cooperating dies mounted for relative movement toward and away from each other, means for moving said dies, a stop for limiting the relative movement of said dies toward one another to a position wherein said dies are spaced a distance approximately equal to the thickness of said candy to be formed, and cutter means slidably circumposed on the outer surface of one of said dies and coordinated with said moving means for movement over and beyond the space between the dies into a position surrounding the other die when the latter are in said spaced position to sever that part of the strip extending beyond the dies.

2. Apparatus for forming a relatively thin flat strip of candy comprising a base member, a first forming die mounted on said base, a carriage mounted for reciprocating movement toward and away from said base, a second forming die mounted on the underside of said carriage opposite to said first forming die to cooperate therewith, means including a cutter plate having an opening therein for slidably engaging the outer walls of both of said dies, resilient coupling means between the last said means and said carriage, a stop means mounted for cooperation between said base and the carriage for limiting the movement of said dies toward each other, said stop means being located in such predetermined position that movement of the forming surfaces of the dies toward each other will terminate at a distance substantially equal to the thickness of the strip so that the forming surfaces will form and shape that part of the strip disposed therebetween into a contoured object having a thickness substantially equal to the thickness of the strip and having a glossy surface, and means coupled with the last said means for moving the carriage through the action of said resilient coupling into engagement with said stop means and for further moving the last said means relative to the carriage and against the action of said resilient means to displace the cutter plate relative to said dies to sever that part of the candy strip extending laterally from said dies.

3. Apparatus for forming contoured candy objects from relatively thin strips of sugar pulled heated candy comprising a base member, a contoured forming die mounted on said base member, a carriage mounted for reciprocating movement toward and away from said base, a cooperating contoured die mounted on the underside of said carriage, means for maintaining the dies at a low temperature relative to the temperature of the strips of candy a yoke, resilient coupling means between said yoke and carriage, a cutter plate carried by said yoke and having an opening therein corresponding to the contour of the outer walls of and slidably engaging said dies, a stop means mounted for cooperation between said base and the carriage for limiting the movement of said dies toward each other, said stop means being located in such predetermined position that movement of the contoured forming surfaces of the dies toward each other will terminate at a distance substantially equal to the thickness of the strip so that the forming surfaces will form and shape that part of the strip disposed therebetween into a contoured object having a thickness substantially equal to the thickness of the strip and having a glossy surface, and actuating means coupled to said yoke for moving the yoke and said carriage through the action of said resilient coupling into engagement with said stop means and for further moving said yoke relative to the carriage and against the action of said resilient means to displace the cutter plate relative to said dies.

4. Apparatus according to claim 3 wherein said temperature maintaining means for the dies includes means connected with at least one of said dies for controlling the temperature thereof by the circulation of a cooling medium therethrough.

5. Apparatus according to claim 3 wherein said temperature maintaining means for the dies includes at least one of said dies being hollow and means for the circulation of a cooling medium therethrough.

6. The method of forming a relatively thin flat strip of pulled sugar candy comprising the steps of heating the candy to a temperature of 140° to 200° Fahrenheit, forming at least part of the strip between preformed cooperating elements maintained at a temperature of 60° to 90° Fahrenheit and spaced apart a distance substantially equal to the thickness of the strip so as to form and shape the part of the strip and to impart a glossy surface free from minute interstices to such part, holding the formed part between said elements and while so doing severing said formed part from the remainder of the strip.

7. The method of forming a contoured candy object having a high gloss surface substantially free of imperfections and interstices from a strip of heated pulled sugar candy, comprising the steps of positioning said strip between a pair of preformed elements, maintaining said elements at a low temperature relative to the temperature of the strip, moving said elements into engagement with said strip at a pressure sufficient to form the strip into the desired contour, stopping the engagement of the elements with the strip at a distance substantially equal to the thickness of the strip, and then severing said object in one operation from the strip about the periphery of said elements.

8. An apparatus for forming a contoured candy object having a high gloss surface substantially free of imperfections and minute interstices from a relatively thin flat strip of heated pulled candy, comprising a base, a first forming die mounted on the base, a carriage mounted for reciprocating movement toward and away from the base, means upstanding from the base for guiding the carriage and preventing rotation thereof relative to the base, a second forming die mounted on the underside of the carriage to cooperate with the first die, means for maintaining the dies at a low temperature relative to the temperature of the strip, means for moving the carriage toward the base, stop means for limiting the movement of the carriage toward the base so that the movement of the forming surfaces of the dies will be arrested at a distance substantially equal to the thickness of the strip, a cutter slidably circumposed on the second die, a yoke carrying said cutter and spaced thereabove, spring means interposed between the yoke and the carriage to maintain the cutter around the second die until the movement that the carriage is stopped by the stop means and the dies are engaged with the strip, said yoke being then moved by said means for moving the carriage past the space between the dies into a position circumposed on the first die to sever the portion of the strip between the dies from the strip.

References Cited in the file of this patent

UNITED STATES PATENTS

| | | |
|---|---|---|
| 391,607 | Hartman | Oct. 23, 1888 |
| 851,135 | Liska | Apr. 23, 1907 |
| 898,478 | Jackson | Sept. 15, 1908 |
| 903,584 | Kohler | Nov. 10, 1908 |
| 948,969 | Dickson | Feb. 8, 1910 |
| 1,833,502 | Strunk | Nov. 24, 1931 |
| 2,409,021 | Dale | Oct. 8, 1946 |

FOREIGN PATENTS

| | | |
|---|---|---|
| 23,008 | Great Britain | Dec. 17, 1900 |
| 23,085 | Great Britain | Oct. 8, 1897 |
| 27,239 | Great Britain | Nov. 26, 1912 |